United States Patent
Rico Alvarino et al.

(10) Patent No.: US 11,811,541 B2
(45) Date of Patent: Nov. 7, 2023

(54) SENDING FEEDBACK AT RADIO ACCESS NETWORK LEVEL

(71) Applicant: QUALCOMM Incorporated, San Diego, CA (US)

(72) Inventors: Alberto Rico Alvarino, San Diego, CA (US); Muhammed Zeyd Coban, Carlsbad, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/365,867

(22) Filed: Jul. 1, 2021

(65) Prior Publication Data

US 2022/0077972 A1    Mar. 10, 2022

Related U.S. Application Data

(60) Provisional application No. 63/075,734, filed on Sep. 8, 2020.

(51) Int. Cl.
*H04W 52/02* (2009.01)
*H04L 1/1867* (2023.01)
(Continued)

(52) U.S. Cl.
CPC ......... *H04L 1/1896* (2013.01); *H04L 1/1819* (2013.01); *H04L 65/65* (2022.05); *H04W 72/0446* (2013.01); *H04W 72/23* (2023.01)

(58) Field of Classification Search
None
See application file for complete search history.

(56) References Cited

U.S. PATENT DOCUMENTS 9,112,797 B2 * 8/2015 Ludwig ............... H04L 47/26
9,408,144 B2 * 8/2016 Tabet ................ H04W 52/0216
(Continued)

FOREIGN PATENT DOCUMENTS

| EP | 1937000 A2 | 6/2008 |
| EP | 3474475 A1 | 4/2019 |
| WO | 2018191644 A1 | 10/2018 |

OTHER PUBLICATIONS

International Search Report and Written Opinion—PCT/US2021/040269—ISA/EPO—dated Oct. 14, 2021.
(Continued)

*Primary Examiner* — Sithu Ko
(74) *Attorney, Agent, or Firm* — Paterson & Sheridan, L.L.P.

(57) ABSTRACT

Aspects of the present disclosure provide techniques for using a radio access network (RAN) level negative acknowledgement (NAK) feedback to indicate at least one missing frame from an encoding device. The RAN level NAK feedback replaces or preempts a decoding device sending an end-to-end feedback to the encoding device using real-time transport protocol (RTP) that has a long latency and may cause freezes at the decoding device. For example, an encoding device may send to a network entity a request for a configuration that configures the encoding device to transmit media frames to the decoding device. The network entity may provide a NAK feedback indicating at least one missing frame. Having received the configuration in response to the request, the encoding device transmits media frames to the decoding device via the network entity, and monitors for NAK feedback from the network entity in accordance with the configuration.

30 Claims, 14 Drawing Sheets

(51) Int. Cl.
  *H04L 1/1812*   (2023.01)
  *H04W 72/0446*  (2023.01)
  *H04L 65/65*    (2022.01)
  *H04W 72/23*    (2023.01)

(56) References Cited

U.S. PATENT DOCUMENTS

| | | | |
|---|---|---|---|
| 10,880,222 B2* | 12/2020 | Hong | H04L 1/1621 |
| 11,082,163 B2* | 8/2021 | Belleschi | H04W 24/08 |
| 11,088,788 B2* | 8/2021 | Liu | H04L 43/0847 |
| 11,202,279 B2* | 12/2021 | Kim | H04L 69/22 |
| 11,463,206 B2* | 10/2022 | Lunttila | H04L 1/1887 |
| 2015/0009930 A1* | 1/2015 | Rapaport | H04L 1/1887 |
| | | | 370/329 |
| 2015/0264359 A1* | 9/2015 | Vanam | H04L 65/70 |
| | | | 375/240.27 |
| 2019/0181986 A1* | 6/2019 | Kitamura | H04L 1/16 |
| 2021/0029761 A1* | 1/2021 | Jung | H04W 4/70 |

OTHER PUBLICATIONS

Mediatek Inc: "Remaining Issues on NR-U Configured Grant", 3GPP Draft, 3GPP TSG RAN WG1 #99, R1-1912091, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823184, 6 Pages.

* cited by examiner

SENDING FEEDBACK AT RADIO ACCESS NETWORK LEVEL

CROSS-REFERENCE TO RELATED APPLICATION

This application claims benefit of and priority to U.S. Provisional Patent Application No. 63/075,734, filed Sep. 8, 2020, which is assigned to the assignee hereof and herein incorporated by reference in its entirety as if fully set forth below and for all applicable purposes.

BACKGROUND

Field of the Disclosure

Aspects of the present disclosure relate to wireless communications, and more particularly, to techniques for sending feedback regarding unsuccessful transmission, for example, of media content.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by an encoding device. The method generally includes sending, to a network entity, a request for a configuration that configures the encoding device to transmit media frames to a decoding device, whereby the network entity is configured to provide a negative acknowledgment (NAK) feedback indicating at least one missing frame; receiving the configuration in response to the request; transmitting media frames to the decoding device via the network entity; and monitoring for NAK feedback from the network entity in accordance with the configuration.

Certain aspects provide a method for wireless communications by a network entity. The method generally includes receiving a request, from an encoding device, for a configuration that configures the encoding device to transmit media frames to a decoding device, wherein the configuration enables the network entity to provide a negative acknowledgment (NAK) feedback indicating at least one missing frame from the encoding device; sending the configuration in response to the request; receiving media frames from the encoding device for streaming the media frames to the decoding device; and sending the NAK feedback to the encoding device in accordance with the configuration.

Certain aspects provide an apparatus for wireless communications. The apparatus generally includes means for sending, to a network entity, a request for a configuration that configures the encoding device to transmit media frames to a decoding device, whereby the network entity is configured to provide a negative acknowledgment (NAK) feedback indicating at least one missing frame; means for receiving the configuration in response to the request; means for transmitting media frames to the decoding device via the network entity; and means for monitoring for NAK feedback from the network entity in accordance with the configuration.

Certain aspects provide an apparatus for wireless communications. The apparatus generally includes means for receiving a request, from an encoding device, for a configuration that configures the encoding device to transmit media frames to a decoding device, wherein the configuration enables the network entity to provide a negative acknowledgment (NAK) feedback indicating at least one missing frame from the encoding device; means for sending the configuration in response to the request; means for receiving media frames from the encoding device for streaming the media frames to the decoding device; and means for sending the NAK feedback to the encoding device in accordance with the configuration.

Certain aspects provide means for, apparatus, and/or computer readable medium having computer executable code stored thereon, for performing the techniques described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
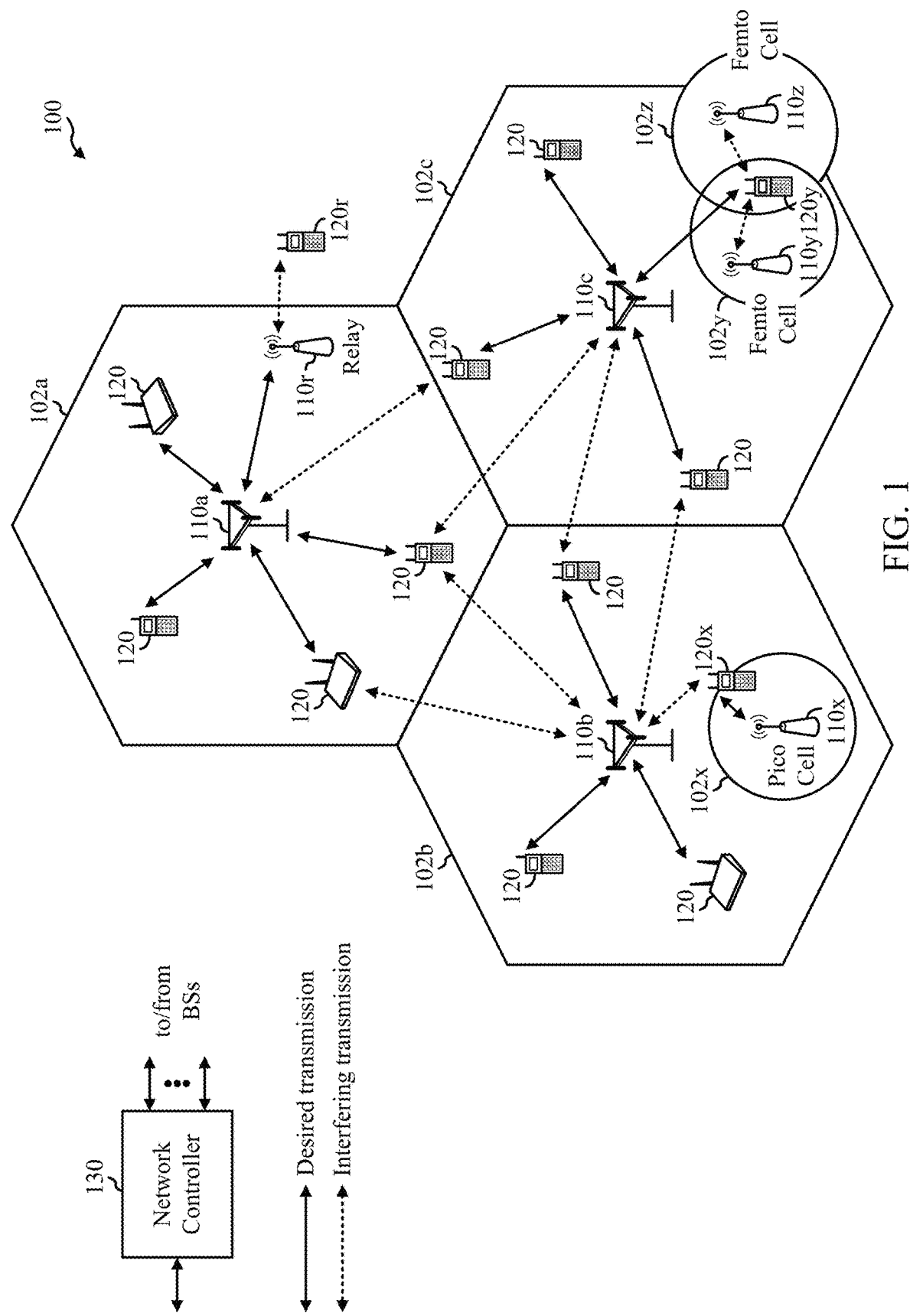
FIG. 1 is a block diagram conceptually illustrating an example telecommunications system, in accordance with certain aspects of the present disclosure.

Aspects of the present disclosure relate to wireless communications between an encoding device (e.g., a transmitter device, such as a user equipment (UE)) and a decoding device (e.g., a receiver device) via a radio access network (RAN) (e.g., a base station such as a gNB), such as, for example, delivering media content (e.g., audio and/or video) over internet protocol (IP) networks.

In one illustrative example, aspects of the present disclosure pertain to techniques providing a RAN level negative-acknowledgement (NAK) feedback to the encoding device, when transmission of at least one frame fails. The network entity may send the RAN level NAK feedback before any end-to-end feedback sent by the decoding device using real-time transport protocol (RTP). The RTP is a network protocol used in communication and entertainment systems having streaming media, including: telephony, video teleconference applications, television services, web-based push-to-talk applications, among other examples. By use of the disclosed RAN level NAK feedback, the encoding device may take timely corrective actions based on the NAK feedback to avoid interruptions at the decoding device. Without the RAN level NAK feedback, the end-to-end RTP feedback between the decoding device and the encoding device may take 400 ms or more, and cause playback freezes at the decoding device due to the inabilities to decode.

According to the present disclosure, the encoding device may send to a network entity a request for a configuration that configures the encoding device to transmit media frames to the decoding device (essentially requesting quick NAK feedback be enabled). The network entity may provide a NAK feedback indicating at least one missing frame. Having received the configuration in response to the request, the encoding device transmits media frames to the decoding device via the network entity, and monitors for NAK feedback from the network entity in accordance with the configuration. In some cases, the media frames are transmitted peer-to-peer between the encoding device and the decoding device via the network; in some cases, the media frames are uplink media frames transmitted to the network entity that further transmits the media frames to the decoding device.

The RAN level NAK feedback may enable the encoding device to avoid the substantial latencies in end-to-end RTP feedbacks, as the RTP feedback may take up to 400 ms or more. During the 400 ms or more latency, the encoding device may have already sent additional information to the decoding device. Besides the lost transmission, the encoding device may have to resend the additional information, which may rely on the lost transmission for decoding. Therefore, providing the RAN level NAK may (1) minimize feedback latency between the encoding device and the decoding device; and (2) save the retransmissions of the additional information by including decoding instructions in subsequent transmissions such that decoding operations at the decoding device may no longer rely on the lost transmission.

In some cases, the encoding device sends a number of media frames to the decoding device. The media frames may be a sequence of image frames that include key frames and non-key frames. For example, the non-key frames may be encoded based on the key frames and thus require the decoding device to correctly receive the key frames for decoding the non-key frames. During operations, transmission errors may occur and the decoding device may fail to receive all key or non-key frames. As mentioned above, sending end-to-end RTP feedback to the encoding device may take up to 400 ms or more. The encoding device would have sent additional media frames, including non-key frames and key frames, in such long duration of latency. As a result, the non-key frames sent during this time may not be decodable and need be resent even if they have been properly received at the decoding device. The techniques disclosed herein may enable the encoding device to realize, via the NAK, that a media frame transmission has failed in a short latency and modify some of the non-key frames into key frames to enable the decoding device to decode the following non-key frames without freeze or jank.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may include a UE 120 and/or base station 110 configured to perform operations 800 and 900 of FIGS. 8 and 9.

As illustrated in FIG. 1, the wireless network 100 may include a number of base stations (BSs) 110 and other network entities. A BS 110 may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS 110 may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS 110 may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs 110 may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
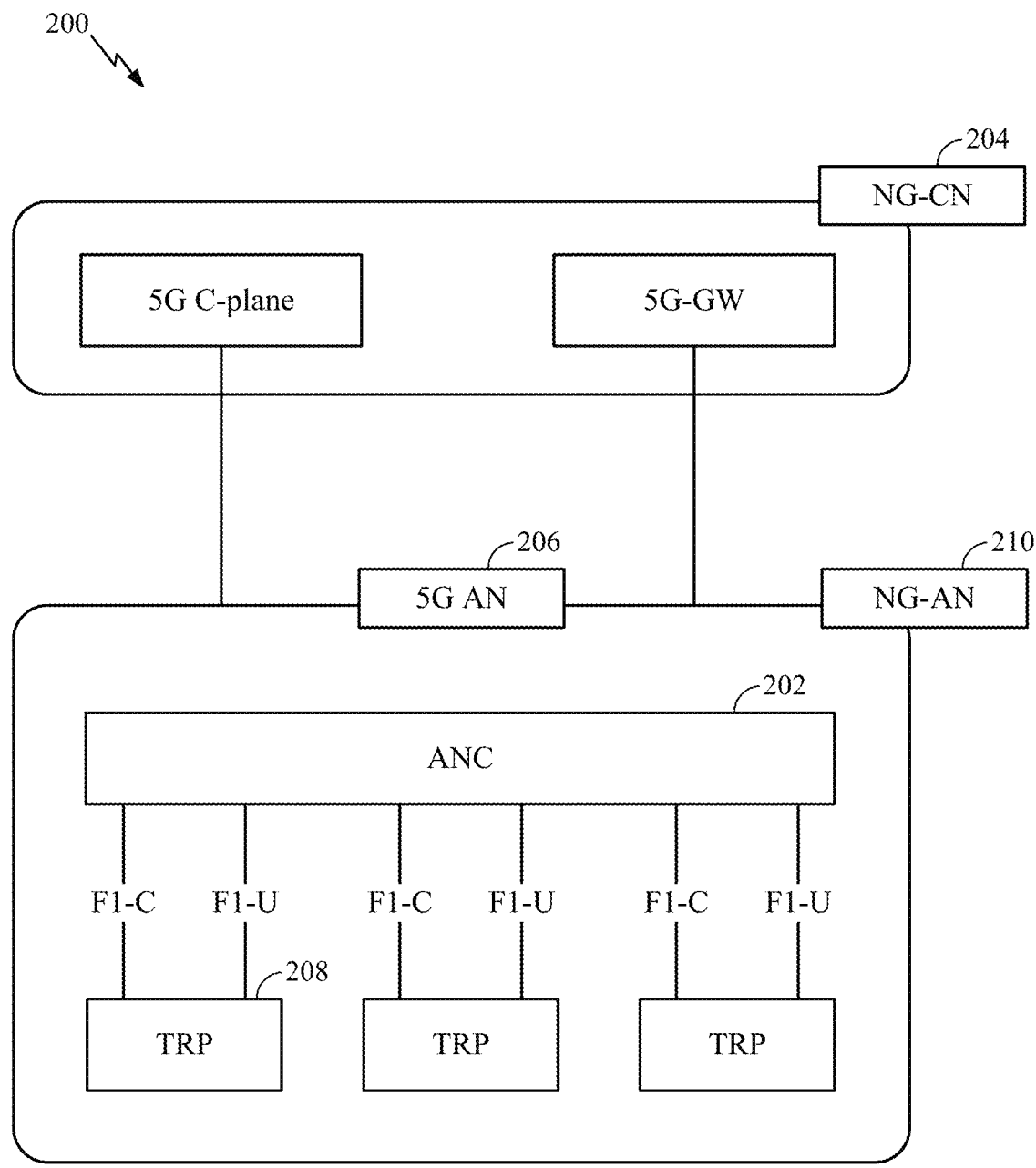
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
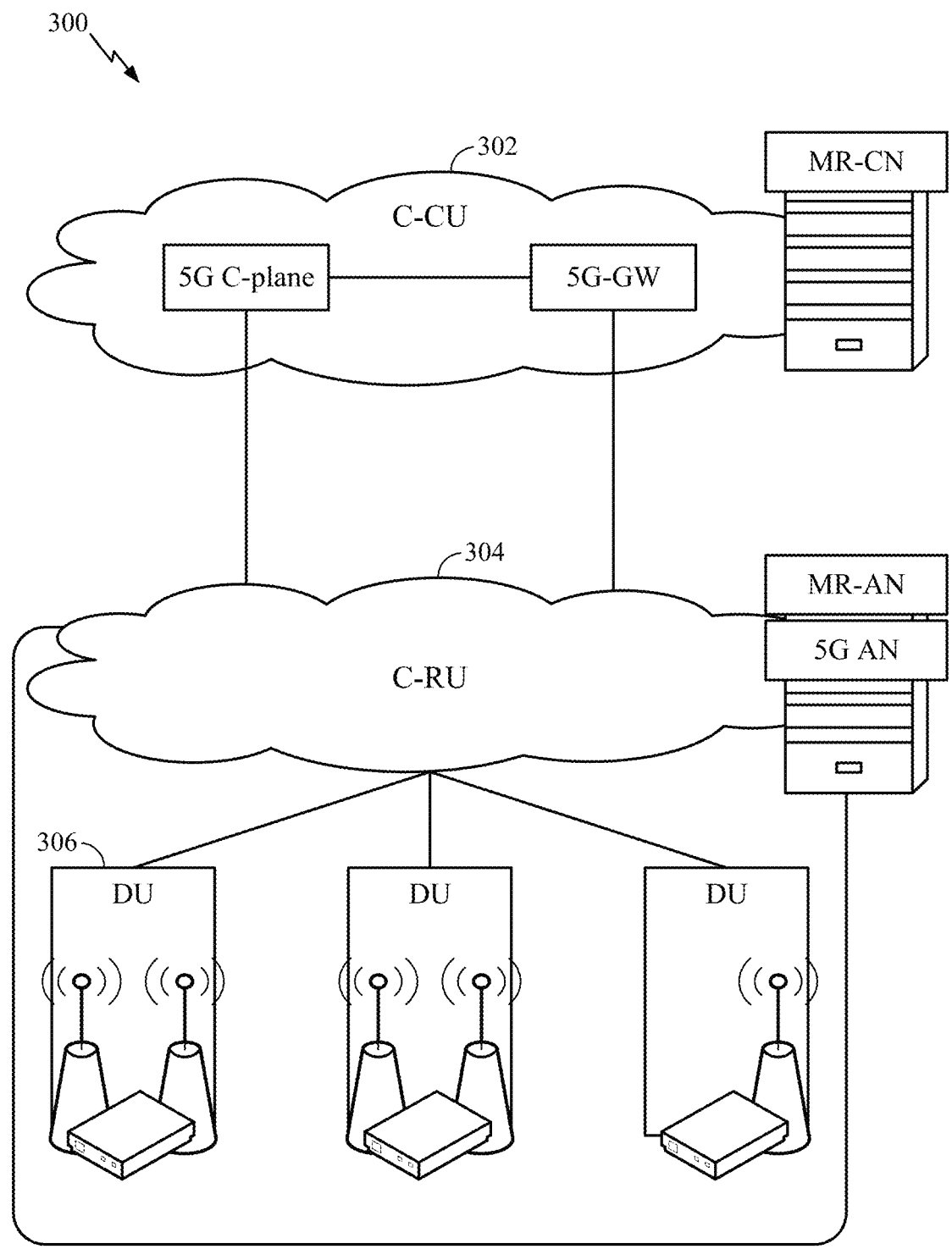
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
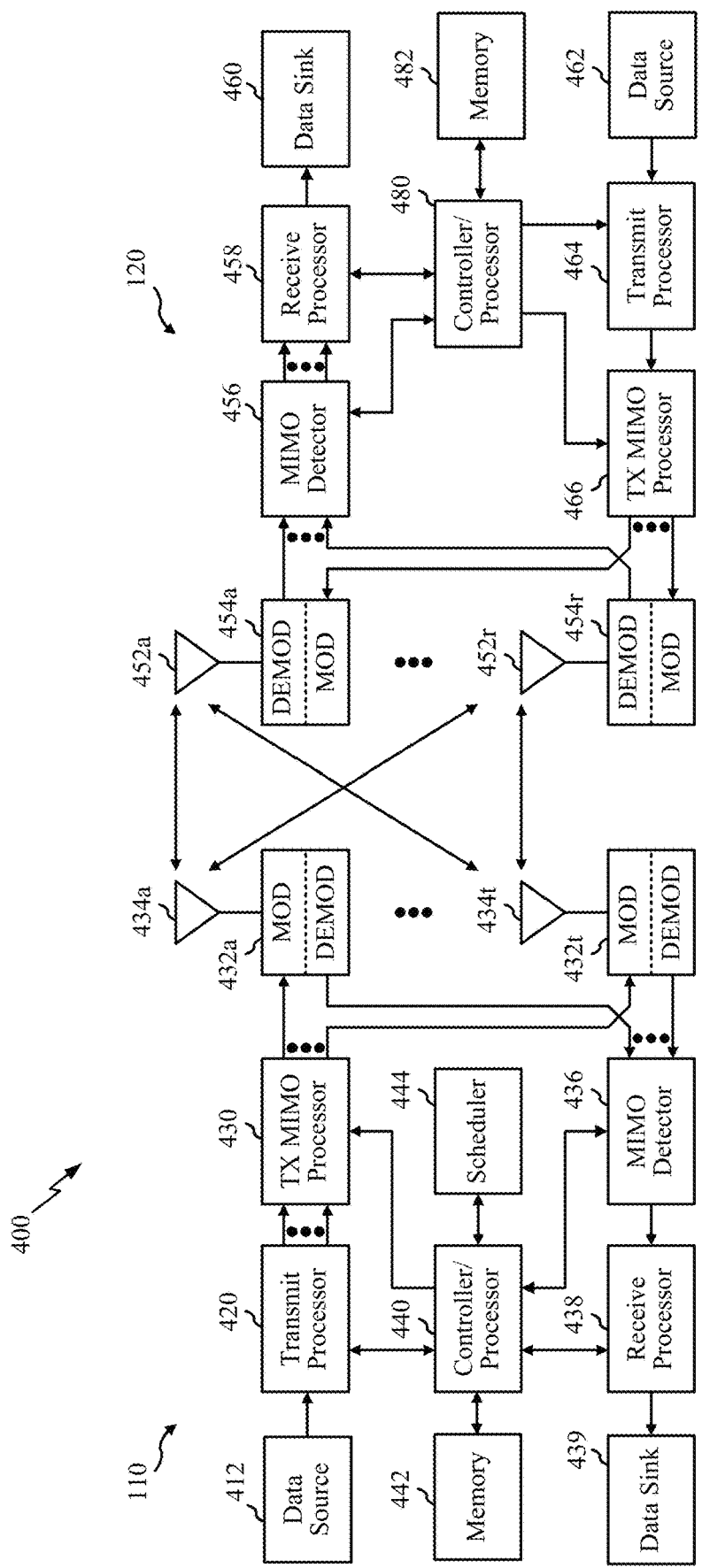
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein with reference to FIGS. 8 and 9.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and/or digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and/or decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
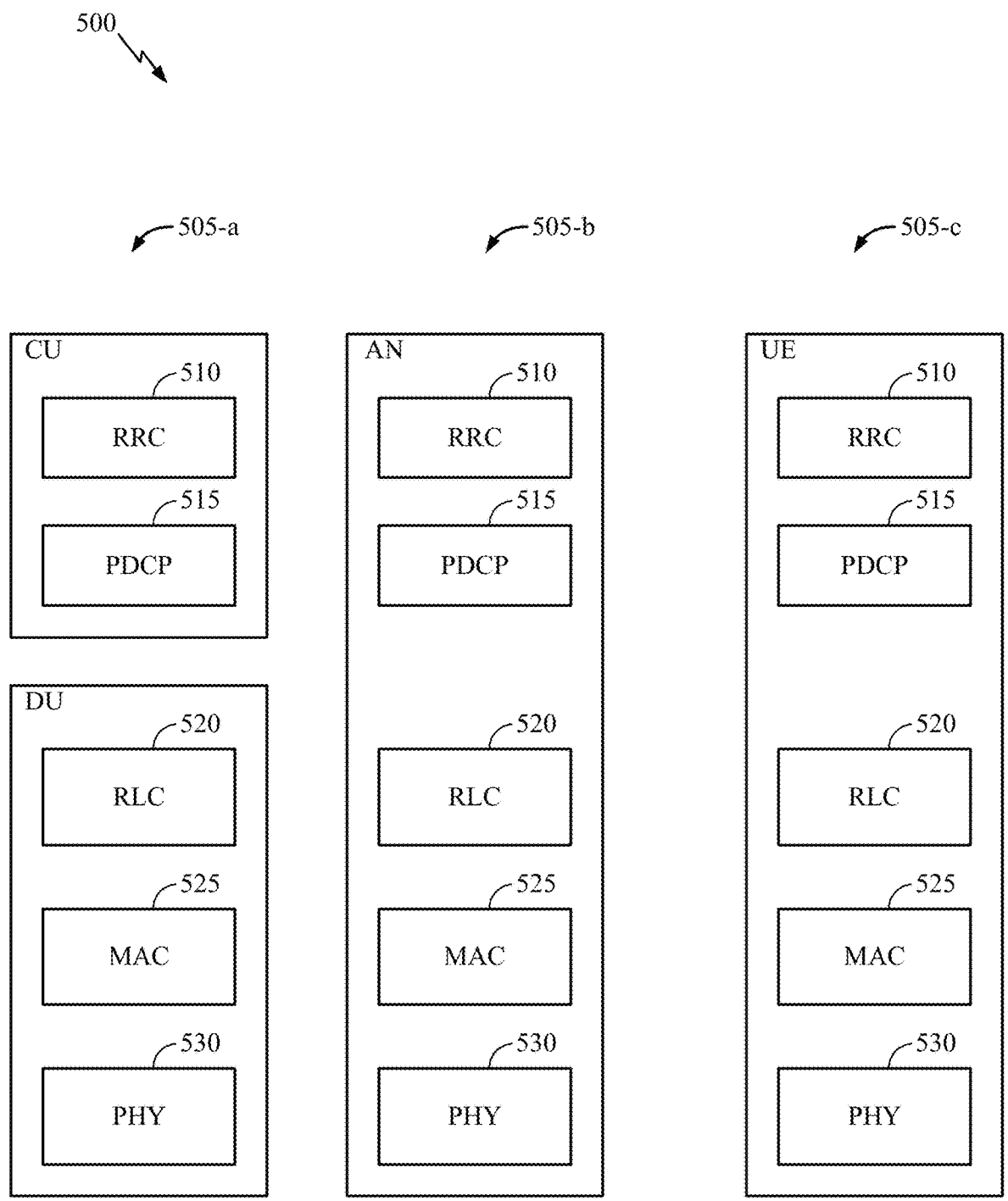
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Example RTP Feedback Mechanism

Figure 6:
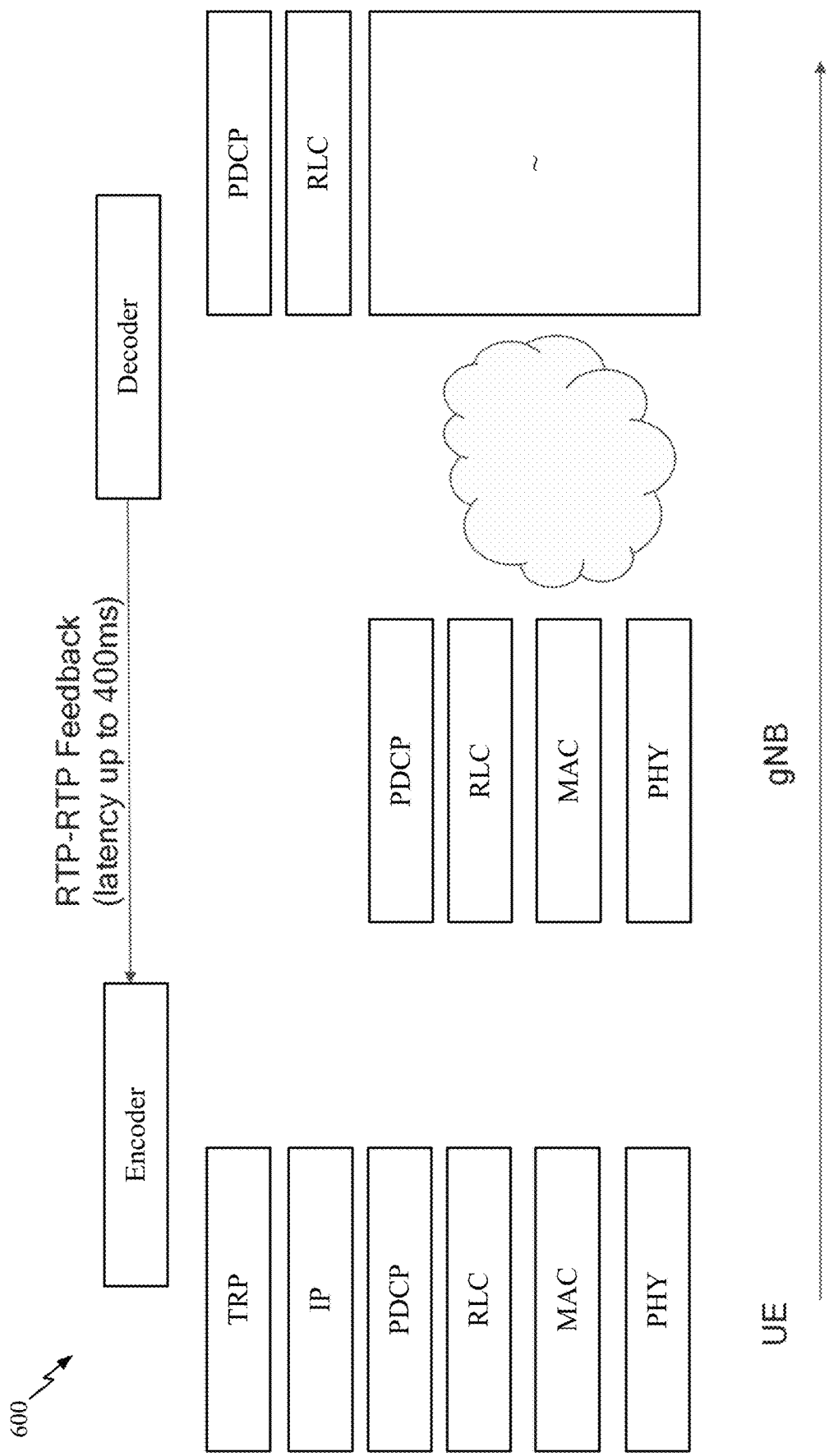
FIG. 6 illustrates an example diagram presenting real-time transport protocol (RTP) to RTP feedback between an encoder and a decoder, in accordance with certain aspects of the present disclosure.

FIG. 6 illustrates an example diagram presenting real-time transport protocol (RTP) to RTP feedback between an encoder and a decoder, in accordance with certain aspects of the present disclosure. As shown, the encoder on the UE side may stream media content to the decoder via the gNB. For example, the UE may transmit media frames to the gNB, which communicates the media frames to the decoder (e.g., on a decoding device). The encoder on the UE side may encode the media frames, including compression, encryption, and/or other operations for efficient, accurate, and secure transmissions. The gNB communicates or streams the media frames to the decoding device. When at least one media frame is not streamed correctly, the decoder provides an end-to-end RTP feedback to the encoder. The end-to-end RTP feedback often has a latency for 400 ms or more. Such latency may be considered substantial and effectively reduced using techniques disclosed herein. An example of the UE transmitting a number of key and non-key media frames (e.g., $x_1, x_2, \ldots, x_8$) is shown in FIG. 7 and described below.

Figure 7:
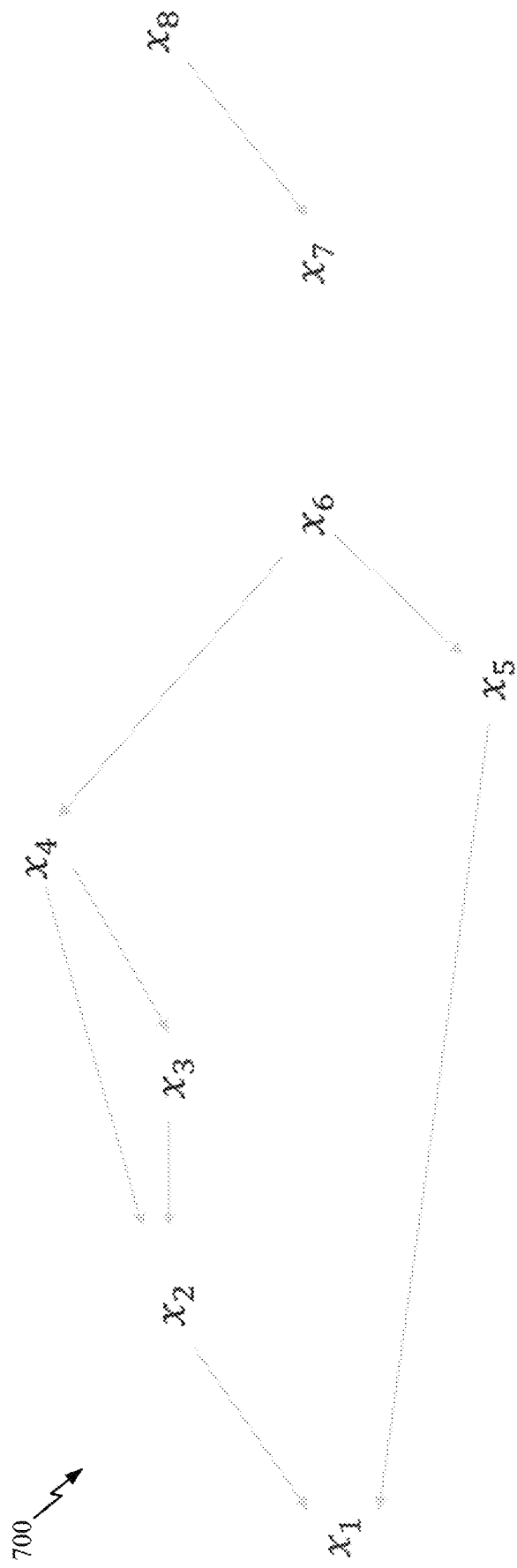
FIG. 7 is a diagram illustrating an example transmission of media frames, in accordance with certain aspects of the present disclosure.

FIG. 7 is a diagram illustrating an example transmission of media frames, in accordance with certain aspects of the present disclosure. As shown, $x_1$ and $x_7$ are self-decodable key frames. $x_1$ provides decoding instructions for non-key frames $x_2$ and $x_5$, and the non-key frames that follow, such as frames $x_3$ and $x_6$. Non-key frames $x_4$ and $x_6$ may be decoded based on two or more other frames. For example, $x_4$ may be decoded if any of $x_1$, $x_2$, or $x_3$ has been successfully received and decoded by the decoding device. Similarly, $x_6$ may be decoded if any of $x_1$-$x_5$ has been successfully received and decoded. Key frame $x_7$ provides decoding instructions for non-key frame $x_8$.

In some cases, the frames $x_1$-$x_8$ may represent video encoding. In one general implementation (e.g., intra-frame ignored, assuming real-time transmission), multiple media frames are transmitted from the encoding device to the decoding device. The input is a sequence of frames: $x_1, \ldots, x_N$. Some of these frames are key frames (they are sent directly), other frames are encoded based on previous frames. For example, a frame may be encoded as a "delta" with respect to the previous frame. In the example shown in FIG. 7, if $x_2$ is lost, all the packets of frames $x_3$-$x_6$ are not decodable until the next key frame $x_7$.

In a general case, the encoding is a directed graph (the encoding of frame $x_L$ is a function of a set of frames $F(x_L) = \{x_{L-n_1}, x_{L-n_2}, \ldots\}$, with $n_i > 0$. Thus, decoding frame $x_L$ may require all frames in set $F(x_L)$. As such, when one frame is lost during transmission, or otherwise failed to be received at the decoding device, the subsequent frames transmitted during the feedback latency period cannot be decoded and requires retransmission. Furthermore, the longer the feedback latency period, the greater number of un-decodable frames would be transmitted, as the encoding device is unaware of the lost or missing frame until receiving the end-to-end RTP feedback. The disclosed techniques mitigate these issues using NAK.

According to aspects of the present disclosure, when the key frame $x_1$ or $x_7$ is lost during transmission, the encoding device, upon receiving a NAK on the RAN level, may adapt to the situation by retransmitting lost frames (e.g., when the NAK latency is insignificant) or modifying one of the subsequent frames to include self-decodable information such that the decoding device may continue decoding operations without the lost frames. As such, the decoding device may not freeze or need to provide end-to-end RTP feedback to the encoding device.

Example Quick NAK Feedback at Radio Access Network Level

Aspects of the present disclosure relate to wireless communications, and more particularly, to techniques for using a radio access network (RAN) level negative acknowledgement (NAK) feedback to indicate at least one missing frame from an encoding device. In some aspects, the RAN level NAK feedback replaces or preempts a decoding device sending an end-to-end feedback to the encoding device using real-time transport protocol (RTP). The RTP is a network protocol for streaming media content from the encoding device to the decoding device. For example, the media content may include: telephony, video teleconference applications, television services, web-based push-to-talk applications, among other examples.

In data streaming, such as in delivering audio and video from a transmitting end (e.g., the encoding device) to a receiving end (e.g., the decoding device) over IP networks, the receiving end may generate a NAK feedback if a packet or frame is missing. In such case, the transmitting end may adapt its prediction path or generate a repair packet to allow the receiving end to continue decoding. However, the latency between the receiving end and the transmitting end often takes up to 400 ms or more. During this time, many frames that may rely on the lost frame for decoding are transmitted. As a result, the receiving end will freeze until the repair packet is received and proper decoding continues. Aspects of present disclosure reduces or eliminates such freezes.

In general aspects of the present disclosure, an encoding device may send, to a network entity, a request for a configuration that configures the encoding device to transmit media frames to a decoding device. The encoding device then receives the configuration in response to the request. The encoding device transmits media frames to the decoding device via the network entity and monitors for NAK feedback from the network entity in accordance with the configuration. The media frames includes one or more key frames that include decoding information needed for decoding non-key frames. Upon receiving the NAK feedback from the network entity due to a failure transmission of a missing frame (e.g., the missing frame may be a key frame), the encoding device may transmit a correction frame generated from a non-key frame and corresponding decoding information of the missing frame. In some cases, the encoding device may retransmit the missing frame(s) or have the correction frame include the missing information of the missing frame(s).

Aspects of the present disclosure provide options for providing NAK feedback at various protocol stack layers (e.g., at least one of the PDCP, RLC, MAC, or PHY layers, as discussed in relation to FIG. 5 above). Such NAK feedback may quickly inform the encoding device regarding lost frames or packets and enable obtaining updated incoming frames or packets to prevent freezing at the decoding device.

Figure 8:
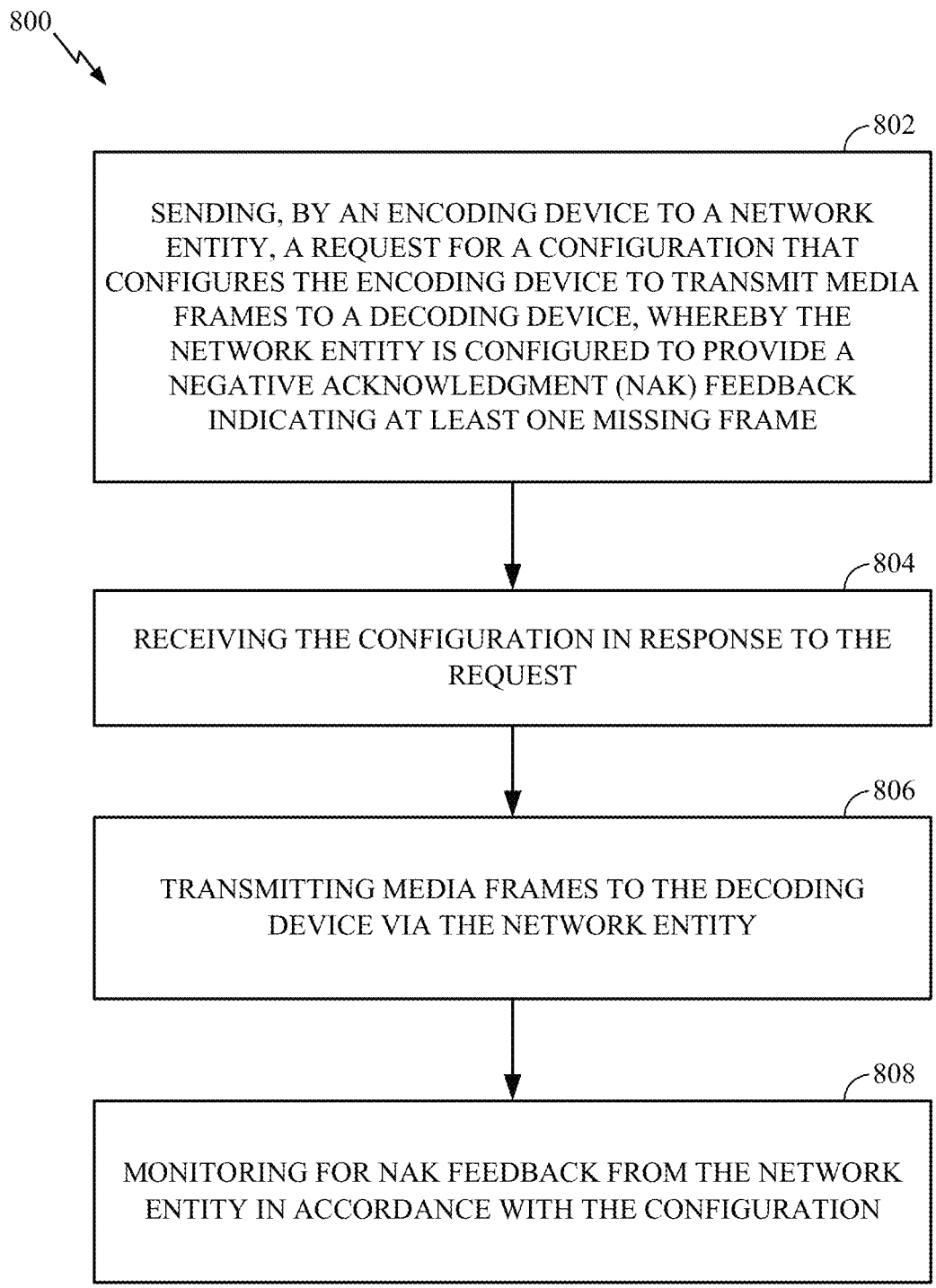
FIG. 8 illustrates example operations for wireless communications by an encoding device, in accordance with certain aspects of the present disclosure.

FIG. 8 illustrates example operations 800 for wireless communications by an encoding device, in accordance with certain aspects of the present disclosure. Operations 800 may be performed, for example, by a UE (e.g., such as a UE 120 in the wireless communication network 100) that is streaming media frames to a decoding device (e.g., another UE 120 in the wireless communication network 100) via the network (e.g., a BS 110 in the wireless communication network 100).

Operations 800 begin, at 802, by sending, to a network entity, a request for a configuration that configures the encoding device to transmit media frames to a decoding device. By using the configuration, the network entity may provide a NAK feedback to the encoding device indicating at least one missing frame or data packet streamed. For example, some UEs may support the NAK feedback on the RAN level while other UEs may rely on end-to-end RTP feedback only. The configuration allows the encoding device to receive and make use of the RAN level NAK feedback from the network entity. In some cases, the encoding device requests the configuration for at least one of a logical channel or a radio bearer.

At 804, the encoding device receives the configuration from the network entity in response to the request. At 806, the encoding device transmits (e.g., streams) media frames to the decoding device via the network entity. For example, the media frames may include data packets or samples of audio, video, or both, for telephony, video teleconference applications, television services, web-based push-to-talk applications.

In some examples, one or more media frames are sent with segmentation into multiple packets, according to certain mapping relationship. As such, the encoding device may identify a frame failure based on a frame to packet mapping.

At 808, the encoding device monitors for NAK feedback from the network entity in accordance with the configuration. In aspects, the NAK feedback may be provided via a radio link control (RLC) or packet data convergence protocol (PDCP) signaling. The NAK feedback may indicate the missing packet is in a logical channel indicated by the encoding device.

In aspects, the NAK feedback is provided via a physical layer (PHY) or medium access control (MAC) layer signaling. The encoding device may determine a logical channel of the missing packet based on a mapping from a logical channel to component carrier or physical layer priority.

Figure 10:
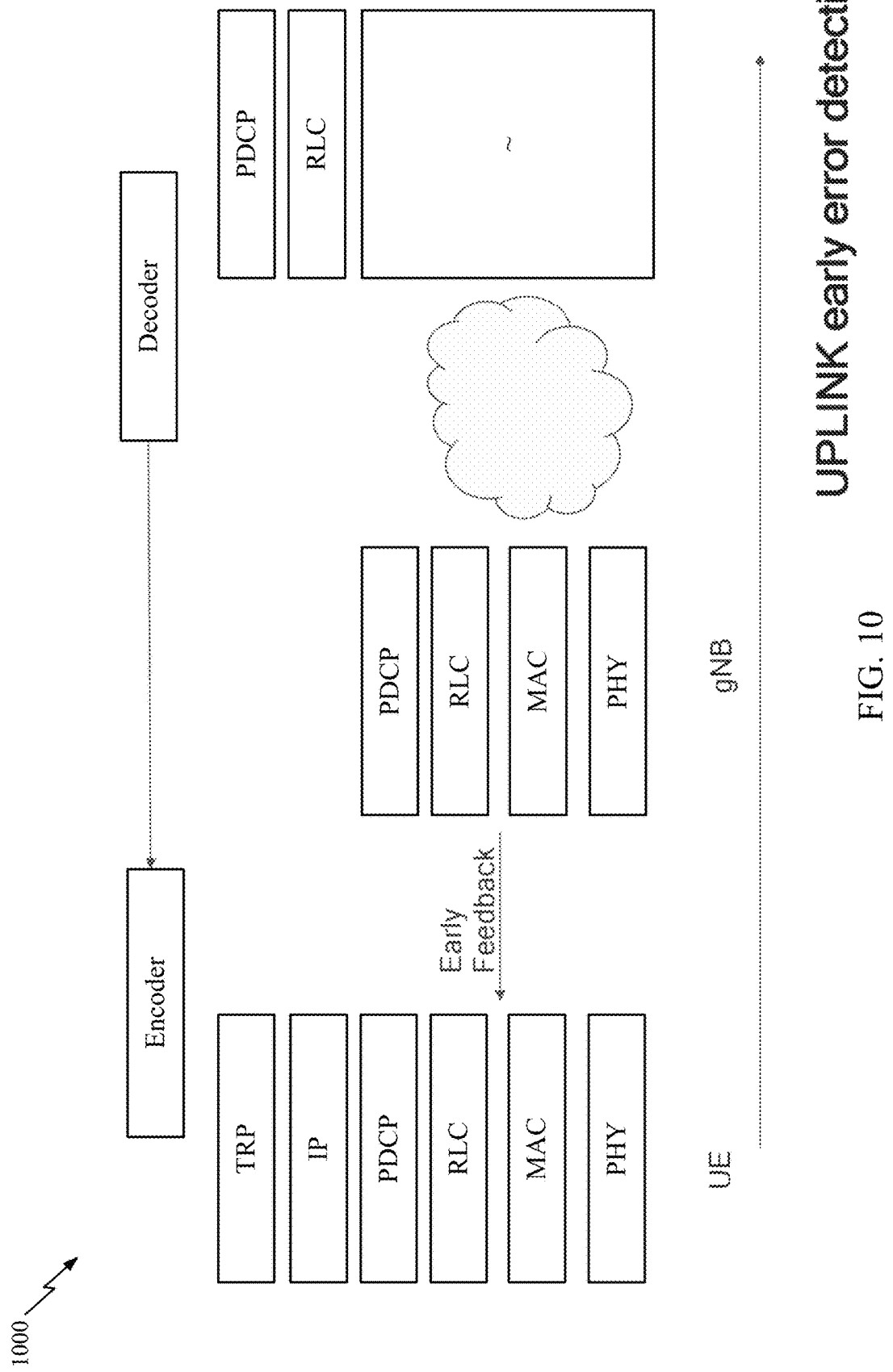
FIG. 10 illustrates an example diagram presenting early feedback at radio access network (RAN) level between an encoder and a decoder, in accordance with certain aspects of the present disclosure.

For example, the encoding device is not aware of whether the media frames transmitted have been successfully received. In order to minimize the latency between detecting lost frames and taking corrective measures, the NAK feedback from the network entity may quickly inform the encoding device regarding lost frames and prevent freezes at the decoding device. For example, as shown in FIG. 10, the gNB may provide an early feedback to the UE when a lost frame has been detected.

Figure 9:
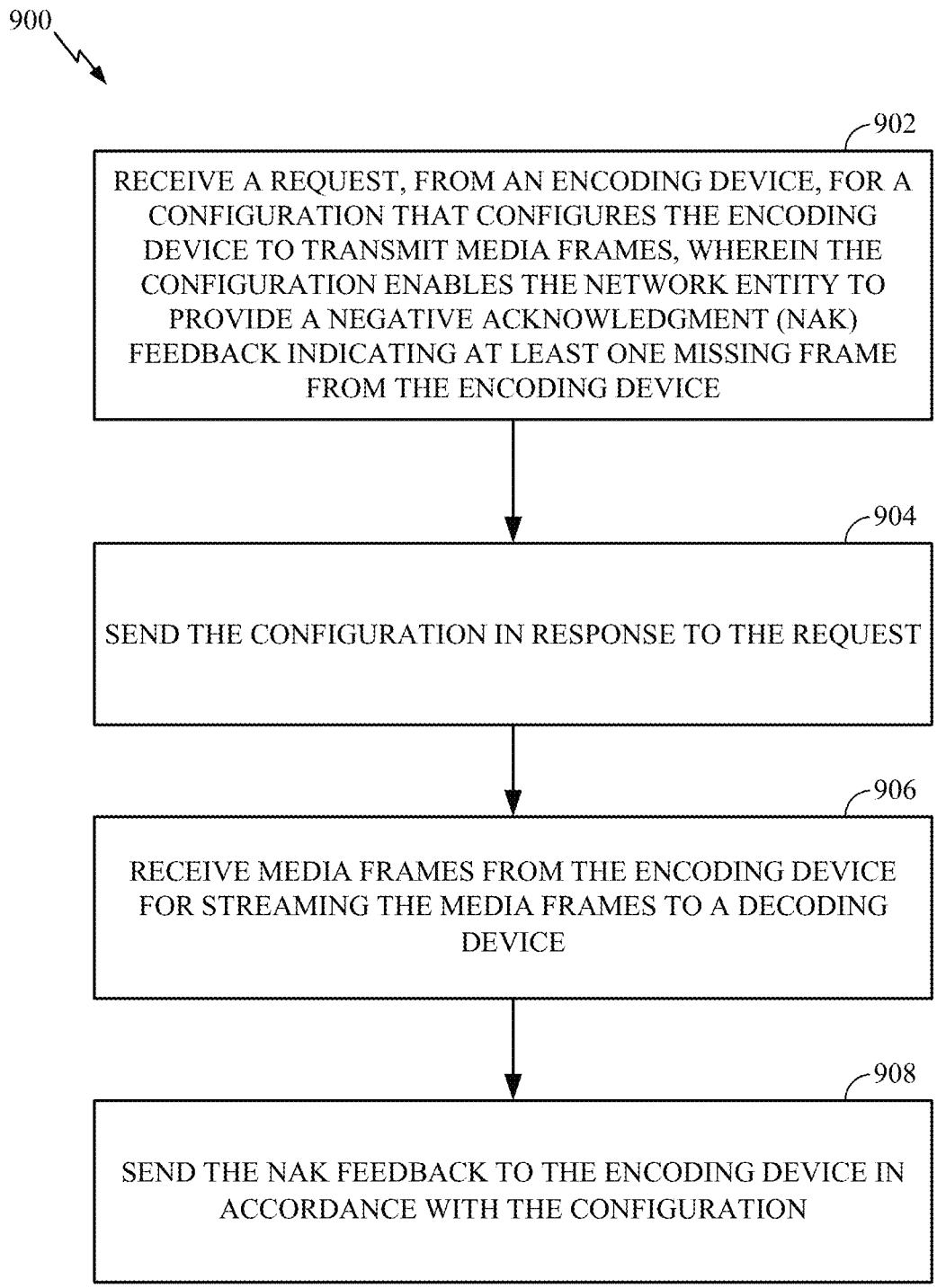
FIG. 9 illustrates example operations for wireless communications by a decoding device, in accordance with certain aspects of the present disclosure.

FIG. 9 illustrates example operations 900 for wireless communications by a network entity, in accordance with certain aspects of the present disclosure, and may be considered complementary to operations 800 of FIG. 8. For example, operations 900 may be performed by one of the base stations (e.g., BS 110 of FIG. 1 or FIG. 2) to process network coded packets from (and provided feedback for termination to) an encoding device (e.g., a UE 120 of FIG. 1) performing operations 800 of FIG. 8.

Operations 900 begin, at 902, by receiving a request, from an encoding device, for a configuration that configures the encoding device to transmit media frames. The configuration enables the network entity to provide a NAK feedback to the encoding device indicating at least one missing frame from the encoding device. At 904, the network entity sends the configuration in response to the request. At 906, the network entity receives media frames from the encoding device for streaming the media frames to a decoding device. At 908, the network entity sends the NAK feedback to the encoding device in accordance with the configuration.

Operations 800 and 900 of FIGS. 8 and 9 may be described with reference to FIG. 10 in general and in FIGS. 11A-11D, which illustrate how the RAN level NAK feedback may be provided in the PHY, MAC, RLC, or PDCP layers.

FIG. 10 illustrates an example diagram presenting early feedback at radio access network (RAN) level between an encoder and a decoder, in accordance with certain aspects of the present disclosure. In FIG. 10, instead of awaiting end-to-end RTP feedback from the decoding device as shown in FIG. 6, the gNB may use one or more of the PHY, MAC, RLC, or PDCP layers to inform the UE that a frame is lost in transmission. Using the early feedback, the UE may retransmit the lost frame or modify subsequent frames to preempt potential decoding failures at the decoding device. Detail implementations are described below in FIGS. 11A-11D.

Figure 11A:
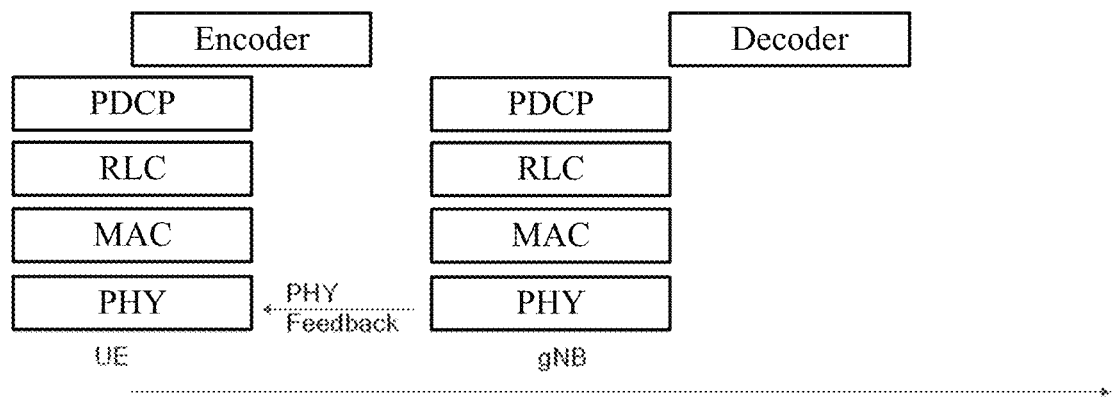
FIG. 11A illustrates an example of network coding feedback provided via a physical layer (PHY) acknowledgment, in accordance with certain aspects of the present disclosure.

FIG. 11A illustrates an example of network coding feedback provided via a physical layer (PHY) acknowledgment, in accordance with certain aspects of the present disclosure. As shown, the gNB provides a PHY feedback to the UE when one or more of multiple media frames transmitted from the UE is lost or otherwise not received properly. In some aspects, the NAK feedback indicates a missing packet to the UE. Based on the NAK feedback, the UE determines that the network entity will not trigger a retransmission of the missing packet and flushes a hybrid automatic repeat request (HARQ) buffer based on the determination.

Very often, the PHY at the gNB may only be aware of the success or failure of a given transmission or retransmission. That is, the UE may not be aware of whether a given frame or packet has been correctly decoded by the gNB. Thus, in some cases, the gNB may trigger a later retransmission of the same HARQ process regardless of a NAK feedback on the PHY layer. In solving this potential issue, the present disclosure provides a NAK feedback that indicates both (1) the lost frame or packet, and (2) that the gNB does not plan to trigger another transmission of the same lost frame or packet. As such, the UE may flush the HARQ buffer and need not expect a retransmission of the same packet.

In one aspect, the PHY level NAK feedback may be provided using a new downlink control information (DCI) that indicates a HARQ process identifier (ID) for a missing packet. The DCI may include a number of bits and indicate the HARQ process ID via a start bit position within the number of bits. For example, a UE may be configured to monitor a DCI by RRC, with the corresponding search space, CORESET, and/or the number of candidates. The UE may be configured with a "start bit" position in the DCI. The "start bit" position may contain the HARQ process ID that the gNB has given up on, allowing the UE to flush the HARQ buffer.

In some cases, a reserved value of the number of bits indicates no NAK feedback. Alternatively, the DCI indicates NAK feedback for a number of HARQ process IDs. Or the DCI indicated NAK feedback for a different encoding device. For example, one of the states (e.g. set to all zeros) may be reserved to indicate "no NAK" (the same DCI may include NAK for a different UE). Using this method, multiple HARQ processes may be provided with NAK feedback simultaneously, e.g. by configuring multiple fields to the UE. The DCI may include multiple fields for multiple HARQ processes on multiple failed frames of a number of frames of information. In some cases, the DCI may be sent on the same component carrier (CC) that schedules the media frames for the uplink traffic. Alternatively, the DCI may be configured in any CC, and may include one or more CC indicators (e.g. carrier indicator field (CIF)) that identifies which CC the HARQ process refers to.

In a second aspect, the PHY level NAK feedback may be provided using a new field in uplink DCI. The DCI includes a toggled new data indicator (NDI) indicating the decoding device is to send a packet with a new transport block (TB). The DCI further includes an explicit acknowledgement indicator (EAI) that indicates whether a previous packet corresponding to the same HARQ process has been successfully received. For example, when the UE receives a DCI with a toggled NDI, the UE is informed that it should get a new TB instead of retransmission. If the NDI value is toggled as compared to previous transmission for the same HARQ process, a new transmission is triggered, else, a retransmission is triggered. Because the UE may not distinguish between whether the gNB has successfully received the packet, or has just given up on it, the new field in the uplink DCI may indicate whether the previous packet for the same HARQ process has been successfully received or not.

The new field may be referred to as the EAI. For example, in one scenario, the UE has been receiving with NDI=1, but at some point, the UE starts receiving grants with NDI=0 (new TB). In the grants that include EAI=0, the EAI means that the previous packets (NDI=1) have been correctly received. Otherwise, when a grant includes EAI=1, the EAI means that the previous packets have not been correctly received.

In a third aspect, the UE may be configured with a maximum number of retransmissions. The UE may declare a packet as missing based on either the DCI carrying NAK feedback or if the maximum number of retransmissions is met for that packet. For example, the gNB scheduler may run based on a maximum number of retransmission for a given packet. After this number is reached, the gNB will not try to reschedule again. Thus, providing this number to the UE in the NAK feedback allows the UE to keep track of the number of transmissions for a given frame or packet. The gNB may deliver the NAK feedback to the UE when the number of transmissions is reached. In some cases, the third aspect may be combined with either of the first two aspects. For example, the gNB may give up on a lost frame or packet before the number of retransmission has reached the maximum number of retransmissions.

In the second and the third aspects, the PHY may deliver the NAK feedback to layers higher than the PHY layer ("higher layers"). The higher layers may map the failed TB to different packets. The encoding device may provide an indication of the NAK feedback to a processing layer higher than the PHY layer for identifying a missing frame, packet, or segment for retransmission. For example, if RLC is running in acknowledged mode (RLC AM), the network can mark the corresponding packet(s) or segment(s) for retransmission (i.e., the same as getting a NAK from the other end RLC entity). If RLC is running in unacknowledged mode (RLC UM), the network entity may deliver the failure message up the stack (no recovery—the encoder will receive the NAK). If PDCP is running duplication, then both RLC legs may be negatively acknowledged (NACK'd) for PDCP to deliver the failure to upper layers. RLC AM and RLC UM are further discussed in FIG. 11C.

Figure 11B:
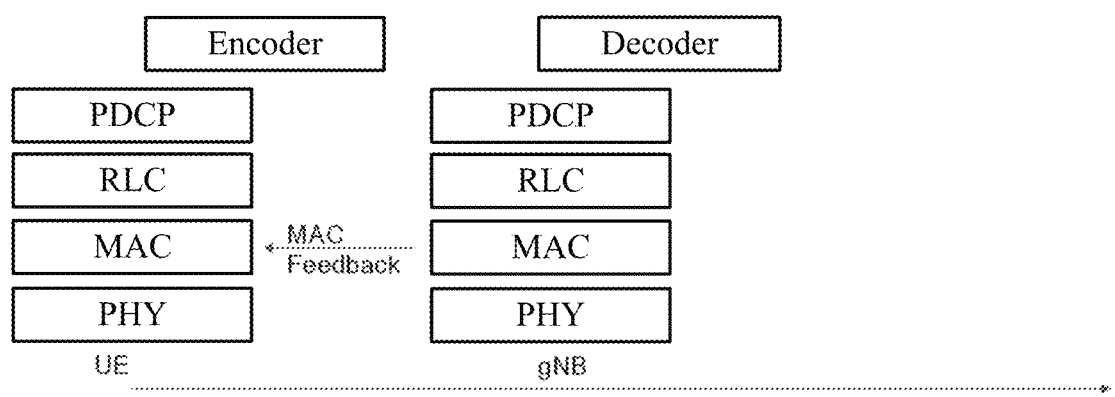
FIG. 11B illustrates an example of network coding feedback provided via a medium access control (MAC) layer acknowledgment, in accordance with certain aspects of the present disclosure.

FIG. 11B illustrates an example of network coding feedback provided via a medium access control (MAC) layer acknowledgment, in accordance with certain aspects of the present disclosure. Via the MAC layer, the gNB can indicate to the UE with the NAK feedback (e.g., a MAC control element (CE)) in the downlink direction that the gNB has given up on certain frame or packet, and will not request further retransmissions thereof. The MAC CE indicates a missing packet and is sent on a same component carrier (CC) that schedules the media frames. For example, the MAC CE indicates one or more HARQ process IDs of one or more missing packets. The MAC CE may include a component carrier (CC) indicator that identifies which CC the HARQ process ID refers to. In some cases, the MAC CE includes an NDI corresponding to a failed HARQ process ID.

In a first example case, the gNB may send the MAC CE on the same CC as the uplink data. The indication includes the HARQ process ID(s) that the gNB decided to flush out. In a second example case, the gNB may send the MAC CE in a different CC than the uplink data. In this case, the MAC CE indicates the CC index of the failed HARQ process. In either of the first and the second cases, there can be an issue of a 'run condition' between the MAC CE and the identification of the HARQ process. The issue may arise when the encoding device receives the MAC CE while the gNB may start a new UL transmission for the same HARQ process. The issue may be solved by not scheduling, by the gNB, the same HARQ process until the MAC CE has been acknowledged. Alternatively, the issue may be solved by including the NDI in the MAC CE, such that the NDI corresponds to the failed HARQ process. This way, the gNB may start a new transmission with toggled NDI. These solutions are applicable to either the first or the second case.

Figure 11C:
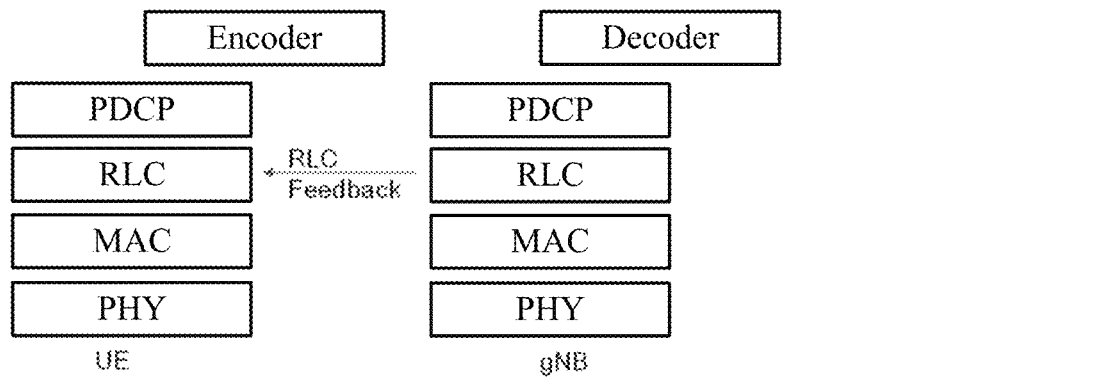
FIG. 11C illustrates an example of network coding feedback provided via a radio link control (RLC) status report, in accordance with certain aspects of the present disclosure.

FIG. 11C illustrates an example of network coding feedback provided via a radio link control (RLC) status report, in accordance with certain aspects of the present disclosure. The UE may send the media frames in an RLC unacknowledged mode (UM) via unsegmented RLC service data units (SDUs) with sequence numbers. As shown, the gNB may send the NAK feedback that indicates a missing sequence number of an RLC SDU. For example, at the RLC layer, when transmissions of one of the media frames fail, errors may be detected as "holes" in the reception window. With current RLC UM, the RLC SDUs often do not have sequence numbers, thus detecting the missing packets may be difficult (unless all RLC SDUs are segmented). Therefore, by configuring RLC UM such that the unsegmented RLC SDUs (as well as the segmented ones) carry a sequence number, the "holes" in the reception window can be accurately identified. The sequence number may be implemented by RRC configuration per RLC entity.

In some cases, the receiving RLC entity may run a timer every time a "hole" is detected (e.g. an RLC SDU with SN=x is received, but SN=x−1 is not received yet). If the RLC SDU is not received before the timer expires (e.g., 10-50 ms, or depending on the frame rate), the receiving RLC entity will send a NAK feedback indicating the missed SN.

In such examples, the RLC UM behavior may be similar to that of RLC AM. The difference is that the NAK feedback does not trigger a retransmission of the lost frame at the UE. The NAK feedback by the gNB only informs higher layers regarding the missing frame. The technique may be implemented with RLC AM by changing the max number of retransmissions to '0' to achieve the similar effect.

In some cases, the decoding device or receiving entity may also send a NAK feedback if some received segments are discarded, such as, for example, due to the SN being outside the reassembly window, or due to the expiration of t-reassembly.

In aspects of RLC AM, the UE may retransmit the lost frames upon receiving NAK feedback from the gNB, and records the number of retransmission of lost frames. When the maximum retransmission number has been reached, the UE may indicate to upper layers that a given packet has failed. As such, the UE may declare an RLC SDU as missing based on either NAK feedback or if a maximum number of retransmissions of the RLC SDUs is met. The UE may provide an indication of the missing RLC SDU to the upper layers.

Figure 11D:
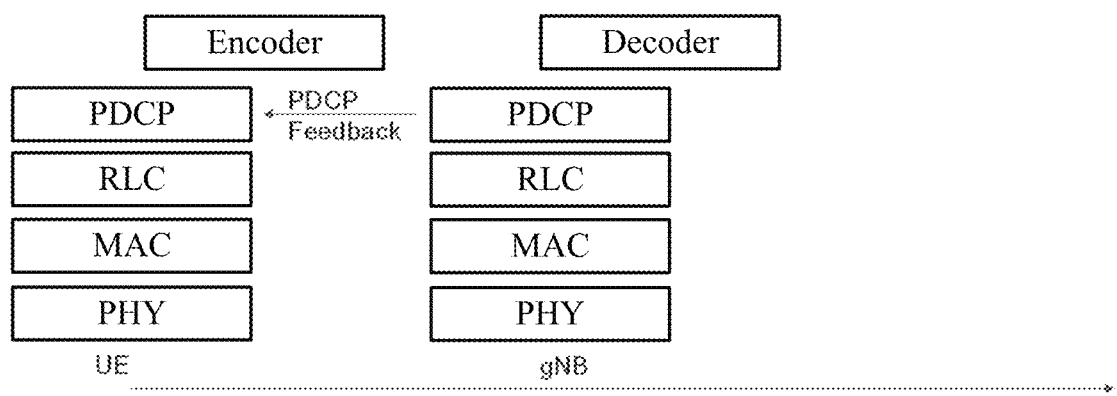
FIG. 11D illustrates an example of network coding feedback provided via a packet data convergence protocol (PDCP) status report, in accordance with certain aspects of the present disclosure.

FIG. 11D illustrates an example of network coding feedback provided via a packet data convergence protocol (PDCP) status report, in accordance with certain aspects of the present disclosure. In aspects, the UE may declare a PDCP SDU as failed based on either the NAK feedback from the gNB or the expiration of an SDU timer. The UE may provide an indication of the failed SDU to an application layer.

Figure 12:
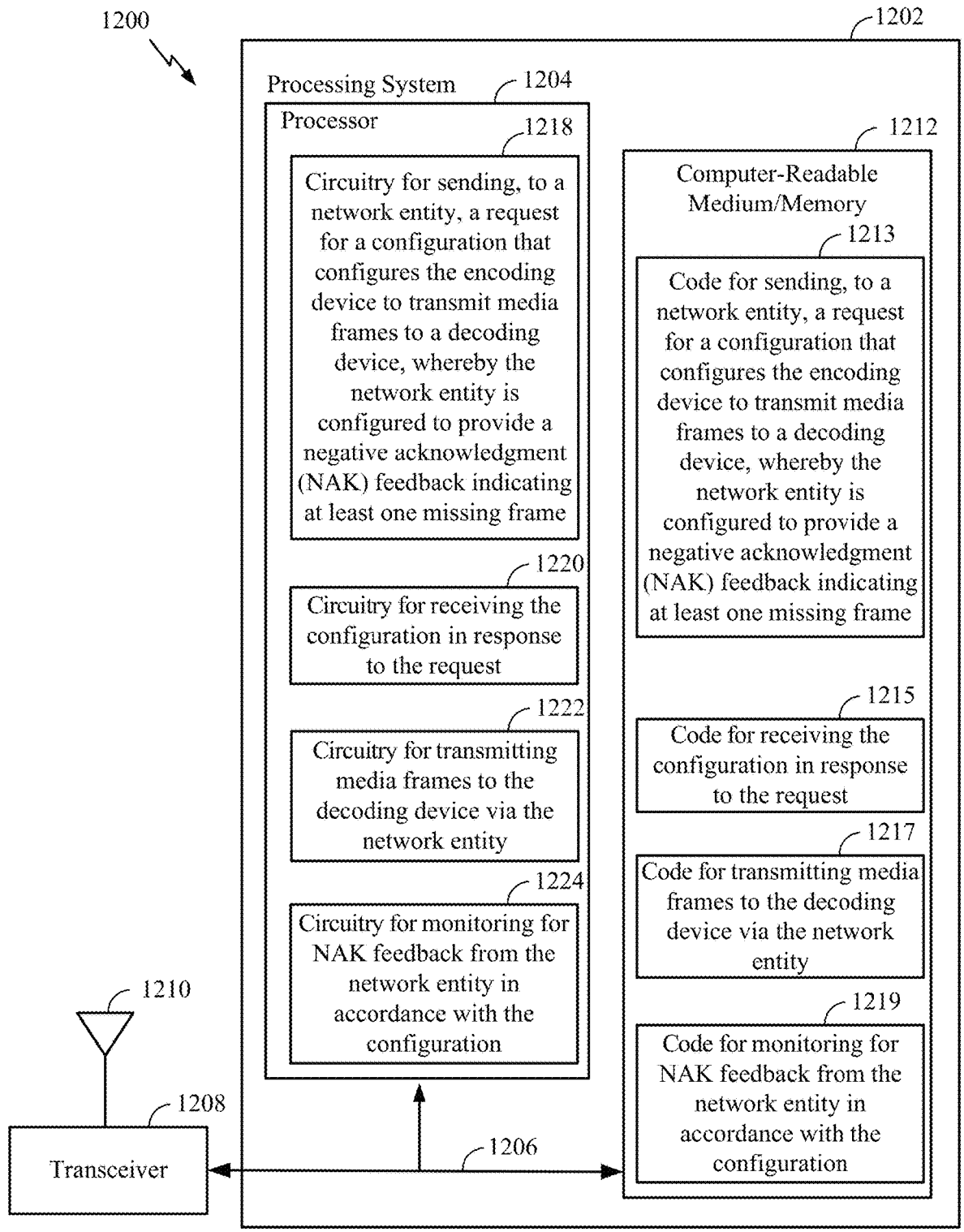
FIG. 12 illustrates a communications device that may include various components configured to perform the operations illustrated in FIG. 8, in accordance with certain aspects of the present disclosure.

FIG. 12 illustrates a communications device 1200 (e.g., a UE) that may include various components (e.g., corresponding to means-plus-function components) configured to perform operations for the techniques disclosed herein, such as the operations 800 illustrated in FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a non-transitory computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations 800 illustrated in FIG. 8, or other operations for performing the various techniques discussed herein. In certain aspects, computer-readable medium/memory 1212 stores code 1213 for sending, to a network entity, a request for a configuration that configures the encoding device to transmit media frames to a decoding device, whereby the network entity is configured to provide a negative acknowledgment (NAK) feedback indicating at least one missing frame, code 1215 for receiving the configuration in response to the request, code 1217 for transmitting media frames to the decoding device via the network entity, and code 1219 for monitoring for NAK feedback from the network entity in accordance with the configuration. In certain aspects, the processor 1204 has circuitry configured to implement the code stored in the computer-readable medium/memory 1212. The processor 1204 includes circuitry 1218 for sending, to a network entity, a request for a configuration that configures the encoding device to transmit media frames to a decoding device, whereby the network entity is configured to provide a negative acknowledgment (NAK) feedback indicating at least one missing frame, circuitry 1220 for receiving the configuration in response to the request, circuitry 1222 for transmitting media frames to the decoding device via the network entity, and circuitry 1224 for monitoring for NAK feedback from the network entity in accordance with the configuration, in accordance with the indicated capability of the UE to switch among CCs.

Figure 13:
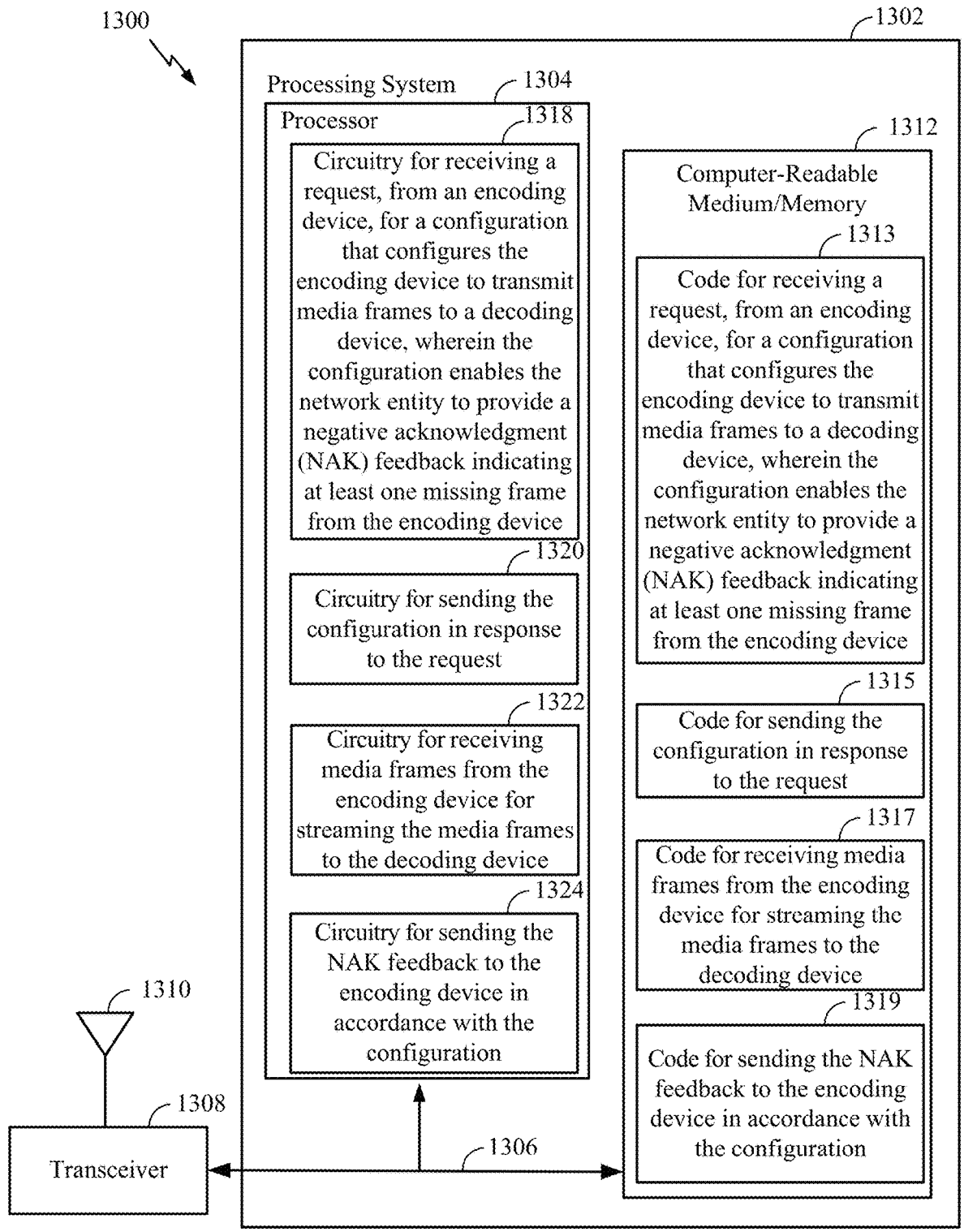
FIG. 13 illustrates a communications device that may include various components configured to perform the operations illustrated in FIG. 9, in accordance with certain aspects of the present disclosure.

FIG. 13 illustrates a communications device 1300 (e.g., a UE) that may include various components (e.g., corresponding to means-plus-function components) configured to perform operations for the techniques disclosed herein, such as the operations 900 illustrated in FIG. 9. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a non-transitory computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations 900 illustrated in FIG. 9, or other operations for performing the various techniques discussed herein. In certain aspects, computer-readable medium/memory 1312 stores code 1313 for receiving a request, from an encoding device, for a configuration that configures the encoding device to transmit media frames to a decoding device, wherein the configuration enables the network entity to provide a negative acknowledgment (NAK) feedback indicating at least one missing frame from the encoding device, code 1315 for sending the configuration in response to the request, code 1317 for receiving media frames from the encoding device for streaming the media frames to the decoding device, and code 1319 for sending the NAK feedback to the encoding device in accordance with the configuration. In certain aspects, the processor 1304 has circuitry configured to implement the code stored in the computer-readable medium/memory 1312. The processor 1304 includes circuitry 1318 for receiving a request, from an encoding device, for a configuration that configures the encoding device to transmit media frames to a decoding device, wherein the configuration enables the network entity to provide a negative acknowledgment (NAK) feedback indicating at least one missing frame from the encoding device, circuitry 1320 for sending the configuration in response to the request, circuitry 1322 for receiving media frames from the encoding device for streaming the media frames to the decoding device, and circuitry 1324 for sending the NAK feedback to the encoding device in accordance with the configuration, in accordance with the indicated capability of the UE to switch among CCs.

Example Aspects

Aspect 1: A method for wireless communication by an encoding device, comprising: sending, to a network entity, a request for a configuration that configures the encoding device to transmit media frames to a decoding device, whereby the network entity is configured to provide a negative acknowledgment (NAK) feedback indicating at least one missing frame; receiving the configuration in response to the request; transmitting media frames to the decoding device via the network entity; and monitoring for NAK feedback from the network entity in accordance with the configuration.

Aspect 2: The method of Aspect 1, wherein: the media frames comprise one or more key frames including decoding information needed for decoding non-key frames; and the method further comprises transmitting a correction frame generated from a non-key frame, corresponding decoding information of the at least one missing frame, or both.

Aspect 3: The method of Aspect 2, wherein the correction frame comprises information of the missing frame.

Aspect 4: The method of any one of Aspects 1-3, wherein the NAK feedback indicates a missing packet and the method further comprises determining that the network entity will not trigger a retransmission of the missing packet; and flushing a hybrid automatic repeat request (HARE) buffer based on the determination.

Aspect 5: The method of any one of Aspects 1-4, wherein the NAK feedback is sent via a downlink control information (DCI) indicating a hybrid automatic repeat request (HARQ) process ID for a missing packet.

Aspect 6: The method of Aspect 5, wherein the DCI comprises a plurality of bits; and the DCI indicates the HARQ process ID via a start bit position within the plurality of bits.

Aspect 7: The method of Aspect 6, wherein at least one of: a reserved value of the plurality of bits indicates no NAK; the DCI indicates NAK feedback for a plurality of HARQ process IDs; or the DCI indicates NAK feedback for a different encoding device.

Aspect 8: The method of any one of Aspects 5-7, wherein the DCI includes multiple fields for multiple hybrid automatic repeat request (HARQ) processes on multiple failed frames of a plurality of frames of information.

Aspect 9: The method of any one of Aspects 5-8, wherein the DCI is sent on a same component carrier (CC) that schedules the media frames.

Aspect 10: The method of any one of Aspects 5-9, wherein the DCI includes a component carrier (CC) indicator that identifies which CC the HARQ process ID refers to.

Aspect 11: The method of any one of Aspects 5-10, wherein the DCI includes: a toggled new data indicator (NDI) indicating the decoding device is to send a packet with a new transport block (TB); and an explicit acknowledgement indicator (EAI) indicating whether a previous packet corresponding to the same HARQ process was successfully received.

Aspect 12: The method of any one of Aspects 5-11, further comprising: receiving configuration for a maximum number of retransmissions; and declaring a packet as missing based on either the DCI carrying NAK feedback or if the maximum number of retransmissions is met for that packet.

Aspect 13: The method of any one of Aspects 5-12, further comprising: providing an indication of the NAK feedback to a processing layer higher than the physical layer for identifying a missing frame, packet, or segment for retransmission.

Aspect 14: The method of Aspect 1, wherein the NAK feedback is sent via a medium access control (MAC) control element (CE) indicating a missing packet and that the network entity will not request retransmission.

Aspect 15: The method of Aspect 14, wherein the MAC CE is sent on a same component carrier (CC) that schedules the media frames and indicates one or more hybrid automatic repeat request (HARQ) process IDs of one or more missing packets.

Aspect 16: The method of Aspect 14 or 15, wherein the MAC CE includes a component carrier (CC) indicator that identifies which CC the hybrid automatic repeat request (HARQ) process ID refers to.

Aspect 17: The method of any one of Aspects 14-16, wherein the MAC CE includes: a toggled new data indicator (NDI) corresponding to a failed hybrid automatic repeat request (HARQ) process ID.

Aspect 18: The method of Aspect 1, wherein: the media frames are sent in a radio link control (RLC) unacknowledged mode (UM) via unsegmented RLC service data units (SDUs) with sequence numbers; and the NAK feedback indicates a missing sequence number of an RLC SDU.

Aspect 19: The method of Aspect 1, further comprising: declaring a radio link control (RLC) SDU as missing based on either NAK feedback or if a maximum number of retransmissions of the RLC SDUs is met; and providing an indication of the missing RLC SDU to upper layers.

Aspect 20: The method of Aspect 1, further comprising declaring a Packet Data Convergence Protocol (PDCP) SDU as failed based on either NAK feedback or expiration of an SDU timer; and providing an indication of the failed SDU to an application layer.

Aspect 21: The method of Aspect 1, wherein the encoding device requests the configuration for at least one of a logical channel or a radio bearer.

Aspect 22: The method of Aspect 21, wherein: the NAK feedback is provided via a radio link control (RLC) or Packet Data Convergence Protocol (PDCP) signaling; and the NAK feedback indicates the missing packet is in a logical channel indicated by the encoding device.

Aspect 23: The method of Aspect 21 or 22, wherein: the NAK feedback is provided via a physical layer or medium access control (MAC) layer signaling; and the encoding device determines a logical channel of the missing packet based on a mapping from a logical channel to component carrier or physical layer priority.

Aspect 24: The method of Aspect 1, wherein one or more media frames are sent with segmentation into multiple packets; and the method further comprises, identifying a frame failure based on a frame to packet mapping.

Aspect 25: A method for wireless communication by a network entity, comprising: receiving a request, from an encoding device, for a configuration that configures the encoding device to transmit media frames to a decoding device, wherein the configuration enables the network entity to provide a negative acknowledgment (NAK) feedback indicating at least one missing frame from the encoding device; sending the configuration in response to the request; receiving media frames from the encoding device for streaming the media frames to the decoding device; and sending the NAK feedback to the encoding device in accordance with the configuration.

Aspect 26: The method of Aspect 25, wherein: the media frames comprise one or more key frames including decoding information needed for decoding non-key frames; and the method further comprises transmitting a correction frame generated from a non-key frame and corresponding decoding information of the at least one missing frame.

Aspect 27: The method of Aspect 26, wherein the correction frame comprises information of the missing frame.

Aspect 28: The method of Aspect 25, wherein the NAK feedback is sent via a downlink control information (DCI) indicating a hybrid automatic repeat request (HARQ) process ID for a missing packet.

Aspect 29: The method of Aspect 28, wherein the DCI comprises a plurality of bits; and the DCI indicates the HARQ process ID via a start bit position within the plurality of bits.

Aspect 30: The method of Aspect 28 or 29, wherein at least one of: a reserved value of the plurality of bits indicates no NAK; the DCI indicates NAK feedback for a plurality of HARQ process IDs; or the DCI indicates NAK feedback for a different encoding device.

Aspect 31: The method of any one of Aspects 28-30, wherein the DCI includes multiple fields for multiple hybrid automatic repeat request (HARQ) processes on multiple failed frames of a plurality of frames of information.

Aspect 32: The method of any one of Aspects 28-31, wherein the DCI is sent on a same component carrier (CC) that schedules the media frames.

Aspect 33: The method of any one of Aspects 28-32, wherein the DCI includes a component carrier (CC) indicator that identifies which CC the HARQ process ID refers to.

Aspect 34: The method of any one of Aspects 28-33, wherein the DCI includes: a toggled new data indicator (NDI) indicating the decoding device is to send a packet with a new transport block (TB); and an explicit acknowledgement indicator (EAI) indicating whether a previous packet corresponding to the same HARQ process was successfully received.

Aspect 35: The method of any one of Aspects 28-34, further comprising: sending configuration for a maximum number of retransmissions; and declaring a packet as missing based on either the DCI carrying NAK feedback or if the maximum number of retransmissions is met for that packet.

Aspect 36: The method of Aspect 25, wherein the NAK feedback is sent via a medium access control (MAC) control element (CE) indicating a missing packet and that the network entity will not request retransmission.

Aspect 37: The method of Aspect 36, wherein the MAC CE is sent on a same component carrier (CC) that schedules the media frames and indicates one or more hybrid automatic repeat request (HARQ) process IDs of one or more missing packets.

Aspect 38: The method of Aspect 36 or 37, wherein the MAC CE includes a component carrier (CC) indicator that identifies which CC the hybrid automatic repeat request (HARQ) process ID refers to.

Aspect 39: The method of any one of Aspects 36-39, wherein the MAC CE includes: a toggled new data indicator (NDI) corresponding to a failed hybrid automatic repeat request (HARQ) process ID.

Aspect 40: The method of Aspect 25, wherein: the media frames are sent in a radio link control (RLC) unacknowledged mode (UM) via unsegmented RLC service data units (SDUs) with sequence numbers; and the NAK feedback indicates a missing sequence number of an RLC SDU.

Aspect 41: The method of Aspect 25, wherein the request is for at least one of a logical channel or a radio bearer.

Aspect 42: The method of Aspect 41, wherein: the NAK feedback is provided via a radio link control (RLC) or Packet Data Convergence Protocol (PDCP) signaling; and the NAK feedback indicates the missing packet is in a logical channel indicated by the encoding device.

Aspect 43: The method of Aspect 41 or 42, wherein the NAK feedback is provided via a physical layer or medium access control (MAC) layer signaling.

Aspect 44: The method of Aspect 25, wherein one or more media frames are sent with segmentation into multiple packets; and the method further comprises, identifying a frame failure based on a frame to packet mapping.

Aspect 45: An apparatus for wireless communications by an encoding device, comprising means for performing the method of any one or more of Aspects 1-24.

Aspect 46: An apparatus for wireless communications by a network entity, comprising means for performing the method of any one or more of Aspects 25-44.

Aspect 47: A computer-readable medium having instructions stored thereon which, when executed by a processor, performs the method of any one of Claims 1-24.

Aspect 48: A computer-readable medium having instructions stored thereon which, when executed by a processor, performs the method of any one of Claims 25-44.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components. For example, various operations shown in FIGS. 8 and 9 may be performed by various processors shown in FIG. 2 of the BS 110 and/or UE 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include various non-transitory memories, such as, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8 and 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for wireless communications by an encoding device, comprising:
   a memory comprising instructions; and
   one or more processors configured, individually or in any combination, to execute the instructions and cause the encoding device to:
      send, to a network entity, a request for a configuration that configures the encoding device to transmit media frames to a decoding device, wherein the request is also for configuring the network entity to provide a negative acknowledgment (NAK) feedback indicating at least one missing frame without a request for a retransmission of the at least one missing frame;
      receive the configuration in response to the request;
      transmit media frames to the decoding device via the network entity; and
      monitor for NAK feedback from the network entity in accordance with the configuration.

2. The apparatus of claim 1, wherein:
   the media frames comprise one or more key frames including decoding information needed for decoding non-key frames; and
   the one or more processors are further configured to execute the instructions and cause the encoding device to transmit a correction frame generated from a non-key frame, corresponding decoding information of the at least one missing frame, or both.

3. The apparatus of claim 2, wherein the correction frame comprises information of the missing frame.

4. The apparatus of claim 1, wherein the NAK feedback indicates a missing packet and the one or more processors are further configured to execute the instructions and cause the encoding device to:
   determine that the network entity will not trigger a retransmission of the missing packet; and
   flush a hybrid automatic repeat request (HARQ) buffer based on the determination.

5. The apparatus of claim 1, wherein the NAK feedback is sent via a downlink control information (DCI) indicating a hybrid automatic repeat request (HARQ) process ID for a missing packet.

6. The apparatus of claim 5, wherein:
   the DCI comprises a plurality of bits; and
   the DCI indicates the HARQ process ID via a start bit position within the plurality of bits.

7. The apparatus of claim 6, wherein at least one of:
a reserved value of the plurality of bits indicates no NAK;
the DCI indicates NAK feedback for a plurality of HARQ process IDs; or
the DCI indicates NAK feedback for a different encoding device.

8. The apparatus of claim 7, wherein the DCI includes multiple fields for multiple hybrid automatic repeat request (HARQ) processes on multiple failed frames of a plurality of frames of information.

9. The apparatus of claim 6, wherein the DCI is sent on a same component carrier (CC) that schedules the media frames.

10. The apparatus of claim 6, wherein the DCI includes a component carrier (CC) indicator that identifies which CC the HARQ process ID refers to.

11. The apparatus of claim 5, wherein the DCI includes:
a toggled new data indicator (NDI) indicating the decoding device is to send a packet with a new transport block (TB); and
an explicit acknowledgement indicator (EAI) indicating whether a previous packet corresponding to the same HARQ process was successfully received.

12. The apparatus of claim 5, wherein the one or more processors are further configured to execute the instructions and cause the encoding device to:
receive configuration for a maximum number of retransmissions; and
declare a packet as missing based on either the DCI carrying NAK feedback or if the maximum number of retransmissions is met for that packet.

13. The apparatus of claim 5, wherein the one or more processors are further configured to execute the instructions and cause the encoding device to:
provide an indication of the NAK feedback to a processing layer higher than the physical layer for identifying a missing frame, packet, or segment for retransmission.

14. The apparatus of claim 1, wherein the NAK feedback is sent via a medium access control (MAC) control element (CE) indicating a missing packet and that the network entity will not request retransmission.

15. The apparatus of claim 14, wherein the MAC CE is sent on a same component carrier (CC) that schedules the media frames and indicates one or more hybrid automatic repeat request (HARQ) process IDs of one or more missing packets.

16. The apparatus of claim 14, wherein the MAC CE includes a component carrier (CC) indicator that identifies which CC the hybrid automatic repeat request (HARQ) process ID refers to.

17. The apparatus of claim 14, wherein the MAC CE includes:
a toggled new data indicator (NDI) corresponding to a failed hybrid automatic repeat request (HARQ) process ID.

18. The apparatus of claim 1, wherein:
the media frames are sent in a radio link control (RLC) unacknowledged mode (UM) via unsegmented RLC service data units (SDUs) with sequence numbers; and
the NAK feedback indicates a missing sequence number of an RLC SDU.

19. The apparatus of claim 1, wherein the one or more processors are further configured to execute the instructions and cause the encoding device to:
declare a radio link control (RLC) SDU as missing based on either NAK feedback or if a maximum number of retransmissions of the RLC SDUs is met; and
provide an indication of the missing RLC SDU to upper layers.

20. The apparatus of claim 1, wherein the one or more processors are further configured to execute the instructions and cause the encoding device to:
declare a Packet Data Convergence Protocol (PDCP) SDU as failed based on either NAK feedback or expiration of an SDU timer; and
provide an indication of the failed SDU to an application layer.

21. The apparatus of claim 1, wherein the encoding device requests the configuration for at least one of a logical channel or a radio bearer.

22. The apparatus of claim 21, wherein:
the NAK feedback is provided via a radio link control (RLC) or Packet Data Convergence Protocol (PDCP) signaling; and
the NAK feedback indicates the missing packet is in a logical channel indicated by the encoding device.

23. The apparatus of claim 21, wherein:
the NAK feedback is provided via a physical layer or medium access control (MAC) layer signaling; and
the one or more processors are further configured to execute the instructions and cause the encoding device to determine a logical channel of the missing packet based on a mapping from a logical channel to component carrier or physical layer priority.

24. The apparatus of claim 1, wherein:
one or more media frames are sent with segmentation into multiple packets; and
the one or more processors are further configured to execute the instructions and cause the encoding device to: identify a frame failure based on a frame to packet mapping.

25. An apparatus for wireless communications by a network entity, comprising:
a memory comprising instructions; and
one or more processors configured, individually or in any combination, to execute the instructions and cause the network entity to:
receive a request, from an encoding device, for a configuration that configures the encoding device to transmit media frames to a decoding device, wherein the configuration enables the network entity to provide a negative acknowledgment (NAK) feedback indicating at least one missing frame from the encoding device without a request for a retransmission of the at least one missing frame;
send the configuration in response to the request;
receive media frames from the encoding device for streaming the media frames to the decoding device; and
send the NAK feedback to the encoding device in accordance with the configuration.

26. The apparatus of claim 25, wherein:
the media frames comprise one or more key frames including decoding information needed for decoding non-key frames; and
the one or more processors are further configured to execute the instructions and cause the network entity to: transmit a correction frame generated from a non-key frame and corresponding decoding information of the at least one missing frame.

27. The apparatus of claim 25, wherein the NAK feedback is sent via a downlink control information (DCI) indicating a hybrid automatic repeat request (HARQ) process ID for a missing packet.

28. The apparatus of claim 25, wherein:
one or more media frames are sent with segmentation into multiple packets; and
the one or more processors are further configured to execute the instructions and cause the network entity to identify a frame failure based on a frame to packet mapping.

29. A method for wireless communications by an encoding device, comprising:
sending, to a network entity, a request for a configuration that configures the encoding device to transmit media frames to a decoding device, wherein the request is also for configuring the network entity to provide a negative acknowledgment (NAK) feedback indicating at least one missing frame without a request for a retransmission of the at least one missing frame;
receiving the configuration in response to the request;
transmitting media frames to the decoding device via the network entity; and
monitoring for NAK feedback from the network entity in accordance with the configuration.

30. A method for wireless communications by a network entity, comprising:
receiving a request, from an encoding device, for a configuration that configures the encoding device to transmit media frames to a decoding device, wherein the configuration enables the network entity to provide a negative acknowledgment (NAK) feedback indicating at least one missing frame from the encoding device without a request for a retransmission of the at least one missing frame;
sending the configuration in response to the request;
receiving media frames from the encoding device for streaming the media frames to the decoding device; and
sending the NAK feedback to the encoding device in accordance with the configuration.

* * * * *